(12) United States Patent
Zhou

(10) Patent No.: US 10,558,237 B2
(45) Date of Patent: Feb. 11, 2020

(54) INFORMATION PROCESSING APPARATUS

(71) Applicant: CANON KABUSHIKI KAISHA, Tokyo (JP)

(72) Inventor: Jiemin Zhou, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 83 days.

(21) Appl. No.: 15/739,875

(22) PCT Filed: Aug. 9, 2016

(86) PCT No.: PCT/JP2016/003657
§ 371 (c)(1),
(2) Date: Dec. 26, 2017

(87) PCT Pub. No.: WO2017/033421
PCT Pub. Date: Mar. 2, 2017

(65) Prior Publication Data
US 2018/0196461 A1 Jul. 12, 2018

(30) Foreign Application Priority Data

Aug. 25, 2015 (JP) .................................. 2015-166184

(51) Int. Cl.
*G06F 1/04* (2006.01)
*G06F 13/42* (2006.01)
(Continued)

(52) U.S. Cl.
CPC .............. *G06F 1/04* (2013.01); *G06F 1/3237* (2013.01); *G06F 1/3284* (2013.01);
(Continued)

(58) Field of Classification Search
CPC ........ G06F 1/04; G06F 1/3237; G06F 1/3284; G06F 13/362; G06F 13/4256;
(Continued)

(56) References Cited

U.S. PATENT DOCUMENTS 5,206,857 A * 4/1993 Farleigh ................ H04J 3/0682
370/452
5,388,223 A * 2/1995 Guthrie .................... G06F 13/37
370/448
(Continued)

FOREIGN PATENT DOCUMENTS

| JP | H9-237131 A | 9/1997 |
| JP | 2010002995 A | 7/2010 |
| WO | 2014062447 A | 4/2014 |

OTHER PUBLICATIONS

Written Opinion and International Search Report issued in International Application No. PCT/JP2016/003657 dated Sep. 20, 2016.

*Primary Examiner* — Volvick Derose
(74) *Attorney, Agent, or Firm* — Venable LLP

(57) ABSTRACT

Supply of a first clock signal used in an interface part of each of a plurality of slave devices on a ring bus and a second clock signal used in a core part of each of the plurality of slave devices is controlled. The slave device as the target of a request issued from a master device is specified. The first clock signal is supplied to each of the plurality of slave devices and the second clock signal is supplied to the specified slaved device.

10 Claims, 10 Drawing Sheets

(51) Int. Cl.
*G06F 1/3237* (2019.01)
*G06F 1/3234* (2019.01)
*G06F 13/362* (2006.01)
*G06F 1/3203* (2019.01)

(52) U.S. Cl.
CPC ........ *G06F 13/362* (2013.01); *G06F 13/4256* (2013.01); *G06F 1/3203* (2013.01)

(58) Field of Classification Search
CPC ...... G06F 15/173; G41J 29/38; Y02D 10/128; Y02D 10/151; Y02D 10/159
USPC ........................................................ 713/600
See application file for complete search history.

(56) References Cited

U.S. PATENT DOCUMENTS

| | | | | |
|---|---|---|---|---|
| 5,638,366 | A * | 6/1997 | Gray | H04L 12/423 370/361 |
| 6,144,675 | A * | 11/2000 | Wakabayashi | H04J 3/0641 370/217 |
| 6,832,325 | B2 * | 12/2004 | Liu | G06F 13/4243 710/100 |
| 9,152,595 | B2 | 10/2015 | Ganasan et al. | |
| 2002/0143998 | A1 * | 10/2002 | Rajagopal | G06F 1/12 709/248 |
| 2005/0021883 | A1 * | 1/2005 | Shishizuka | H04N 1/00204 710/20 |
| 2005/0265262 | A1 * | 12/2005 | Mizuguchi | H04L 12/10 370/258 |
| 2011/0225443 | A1 * | 9/2011 | Takahashi | G06F 1/04 713/503 |
| 2014/0115221 | A1 * | 4/2014 | Ganasan | G06F 13/4004 710/307 |
| 2014/0229644 | A1 * | 8/2014 | Thanigasalam | G06F 13/24 710/110 |
| 2014/0233372 | A1 * | 8/2014 | Edmiston | H04L 12/40019 370/225 |
| 2014/0247892 | A1 * | 9/2014 | Williams | H04B 3/54 375/257 |
| 2014/0325104 | A1 * | 10/2014 | Rohatschek | G06F 13/4247 710/110 |
| 2015/0084679 | A1 * | 3/2015 | Lin | H03L 7/23 327/160 |
| 2015/0362978 | A1 * | 12/2015 | Kothari | G06F 1/3237 713/322 |
| 2016/0119109 | A1 * | 4/2016 | Baumeister | G06F 13/4291 370/294 |
| 2016/0239060 | A1 * | 8/2016 | Koob | G06F 1/3237 |
| 2016/0242057 | A1 * | 8/2016 | Ripley | H04W 24/08 |
| 2016/0352208 | A1 * | 12/2016 | Wien | H02M 1/0845 |
| 2017/0222829 | A1 * | 8/2017 | Kessler | H04L 12/43 |

* cited by examiner

[Fig. 1]
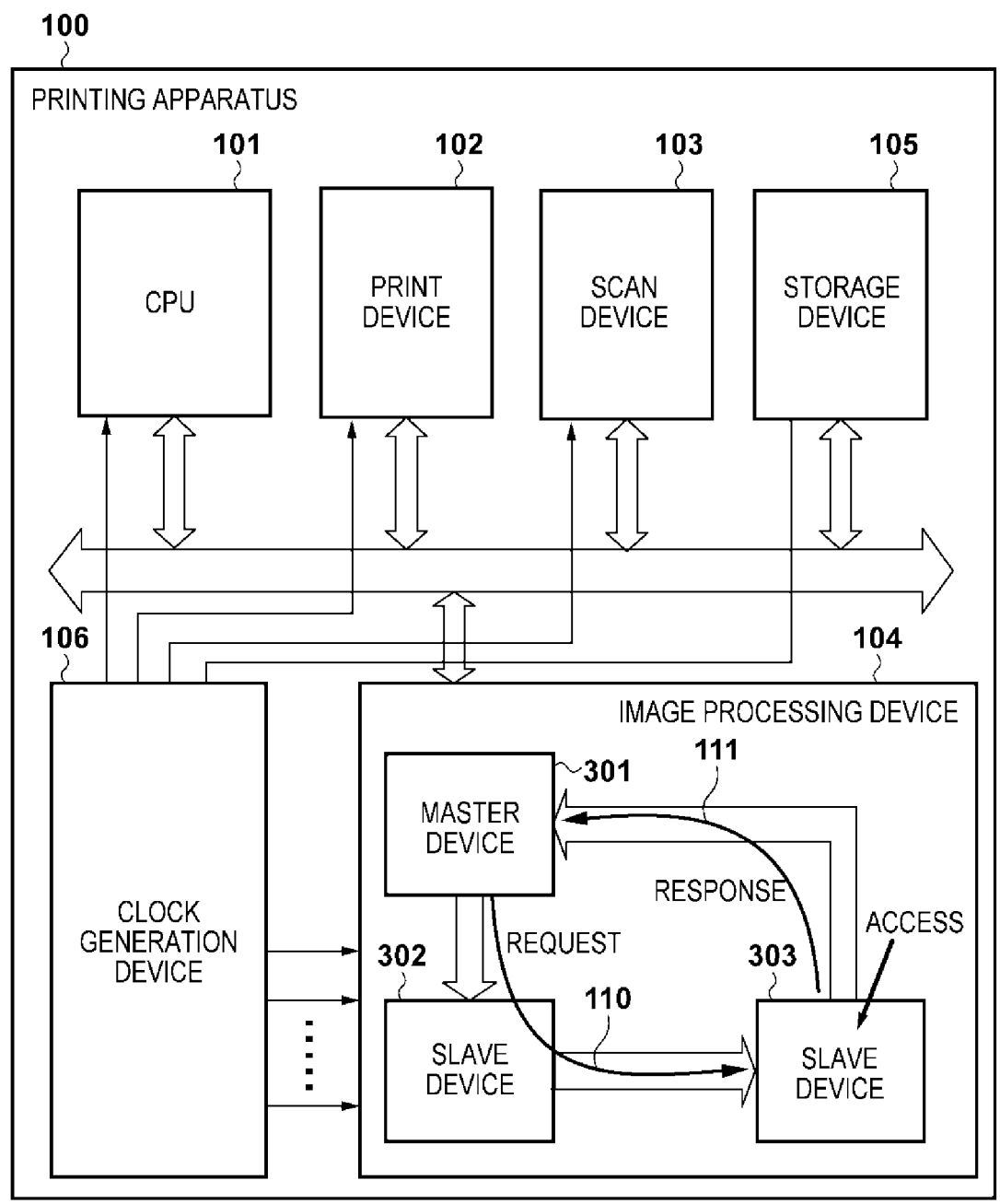

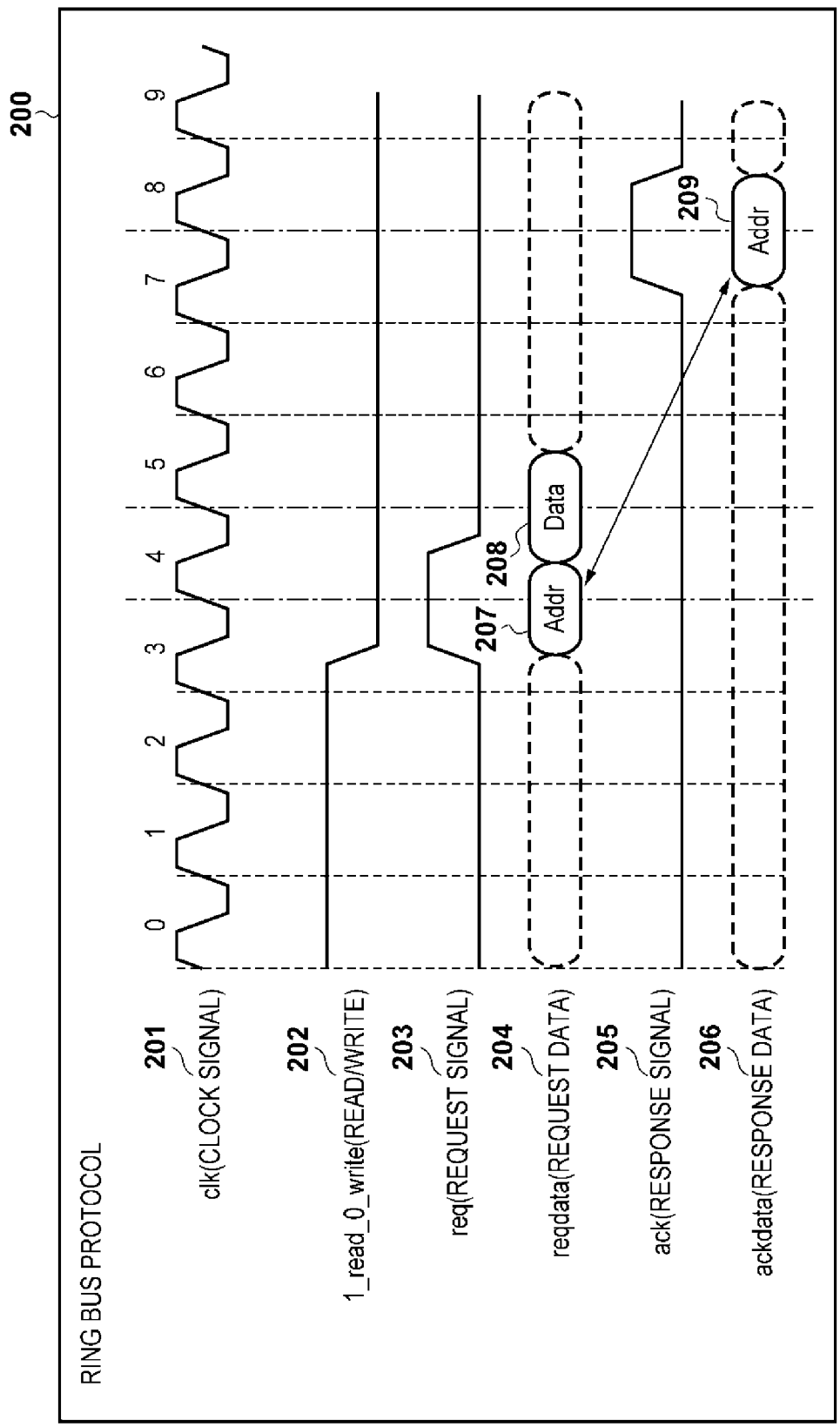

[Fig. 3]
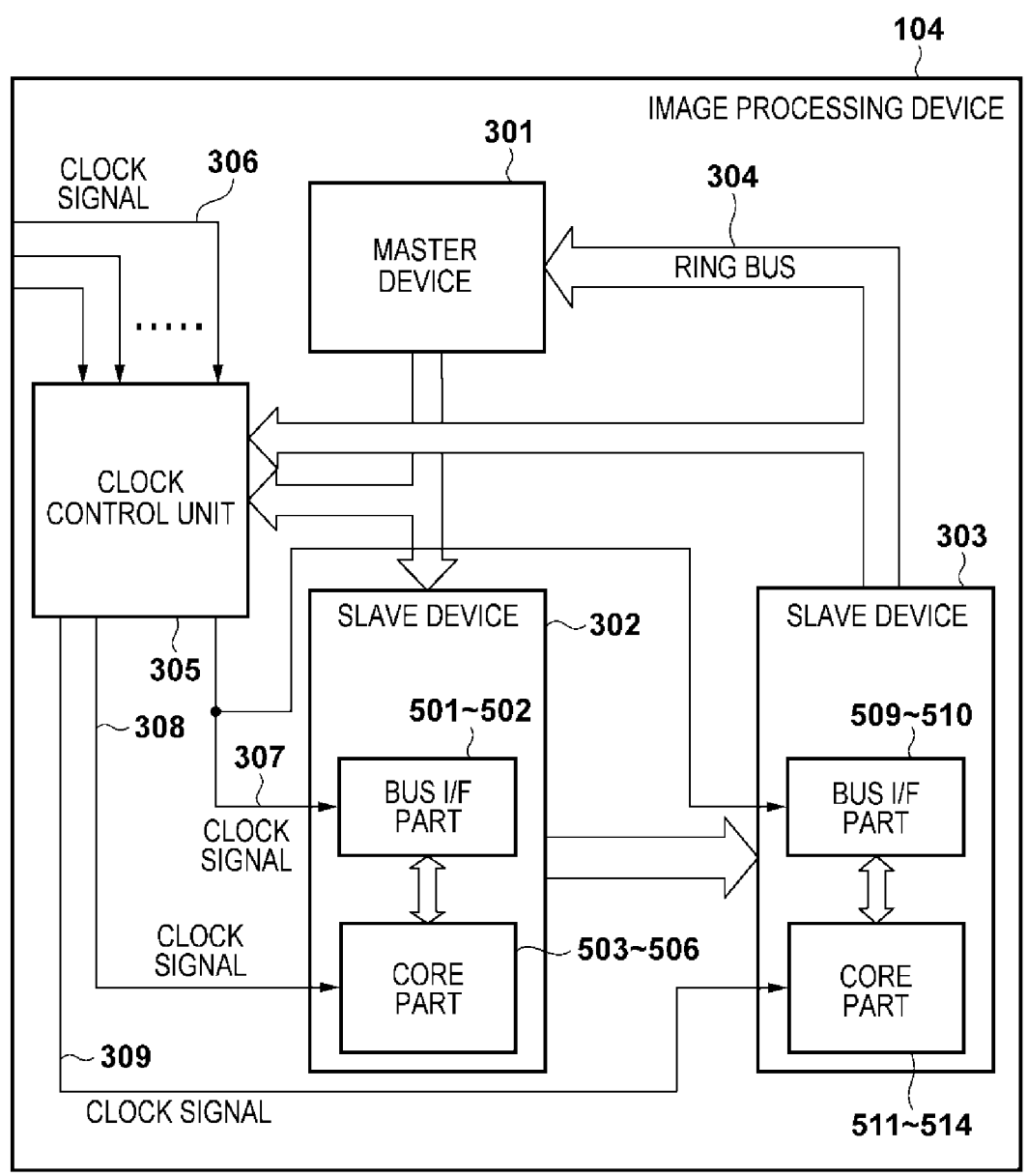

[Fig. 4]
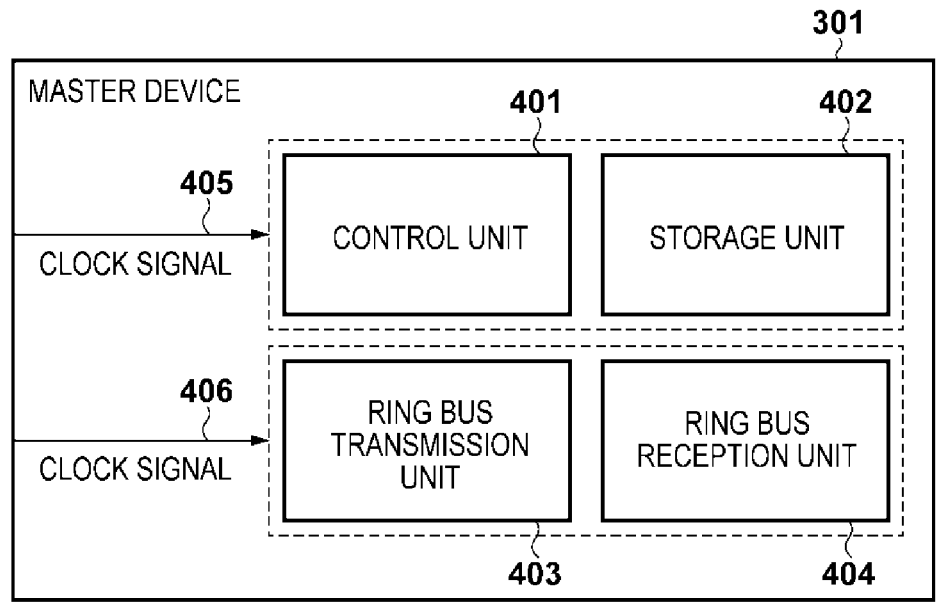
[Fig. 5]
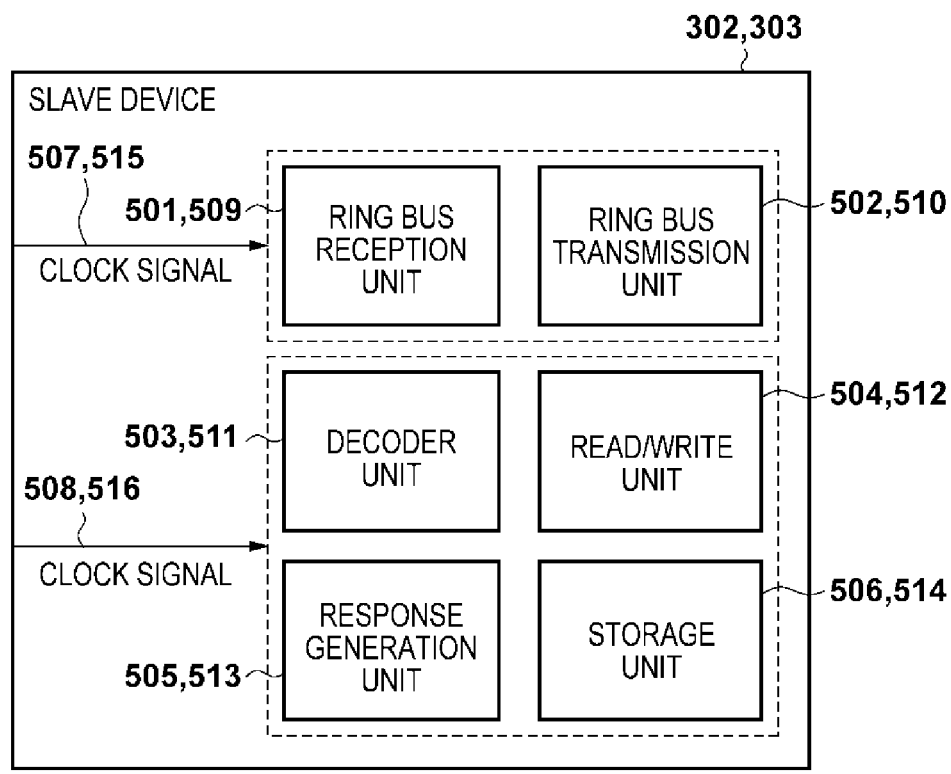

[Fig. 6]
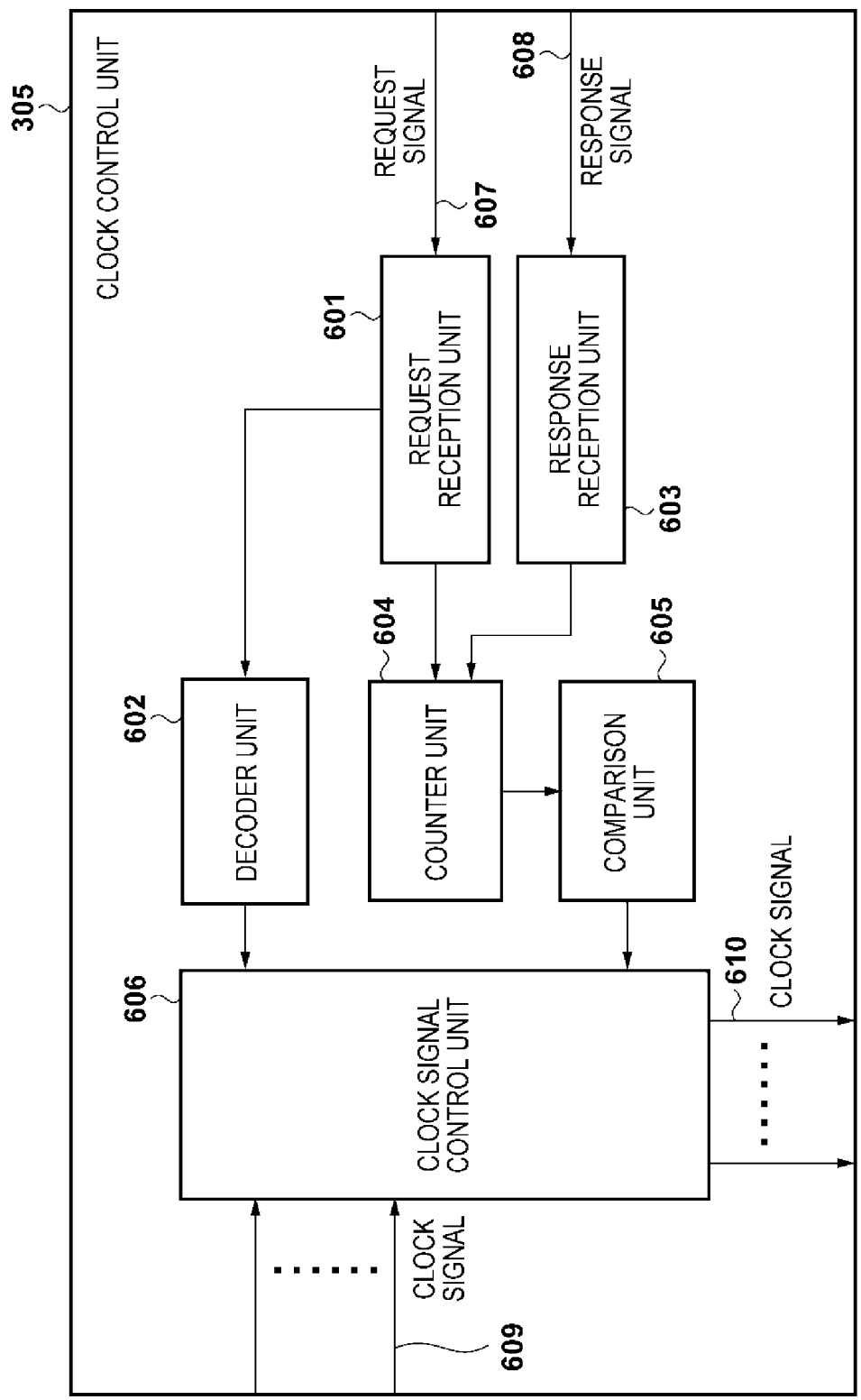

[Fig. 7]
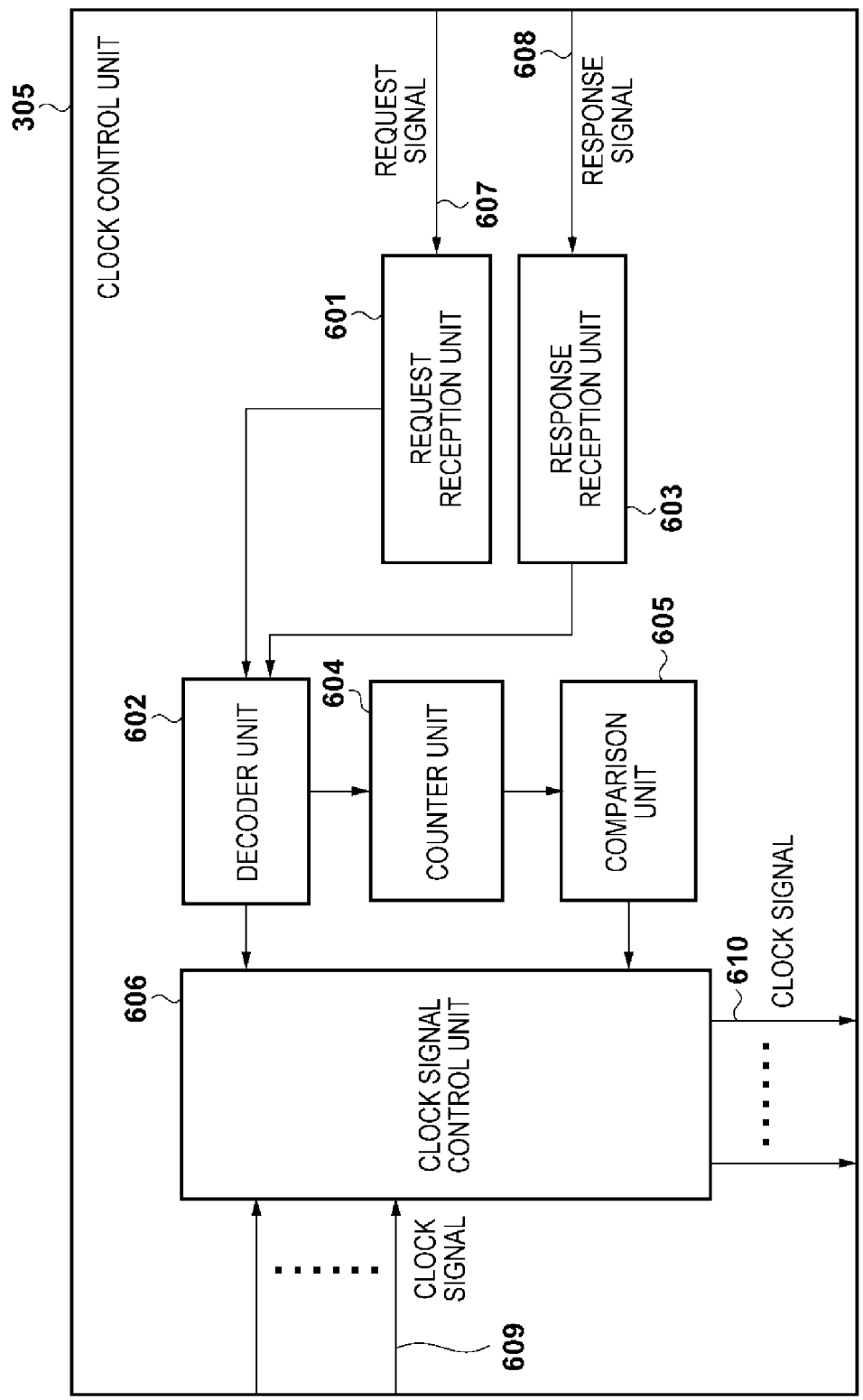

[Fig. 8A]
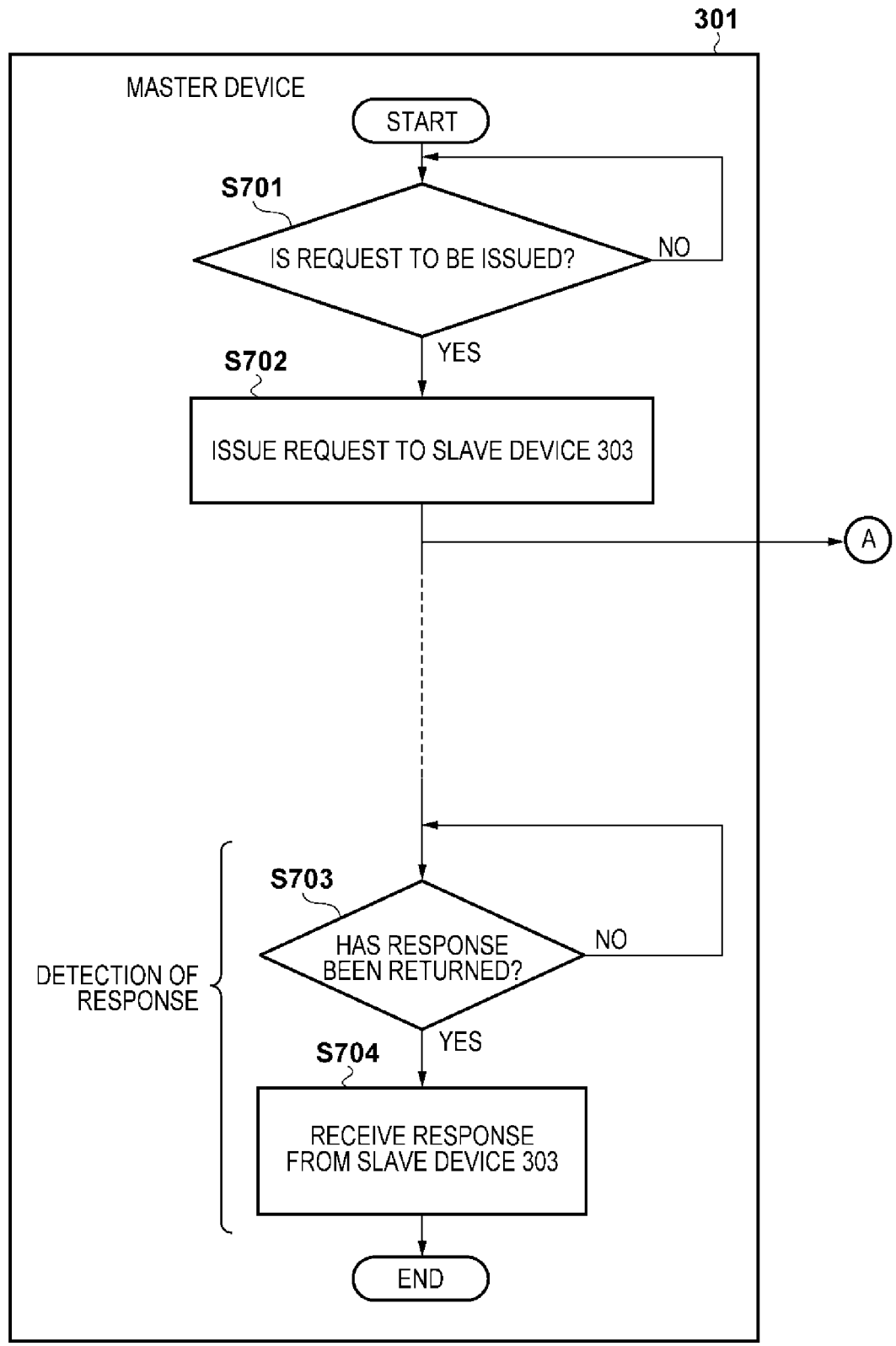

[Fig. 8B]
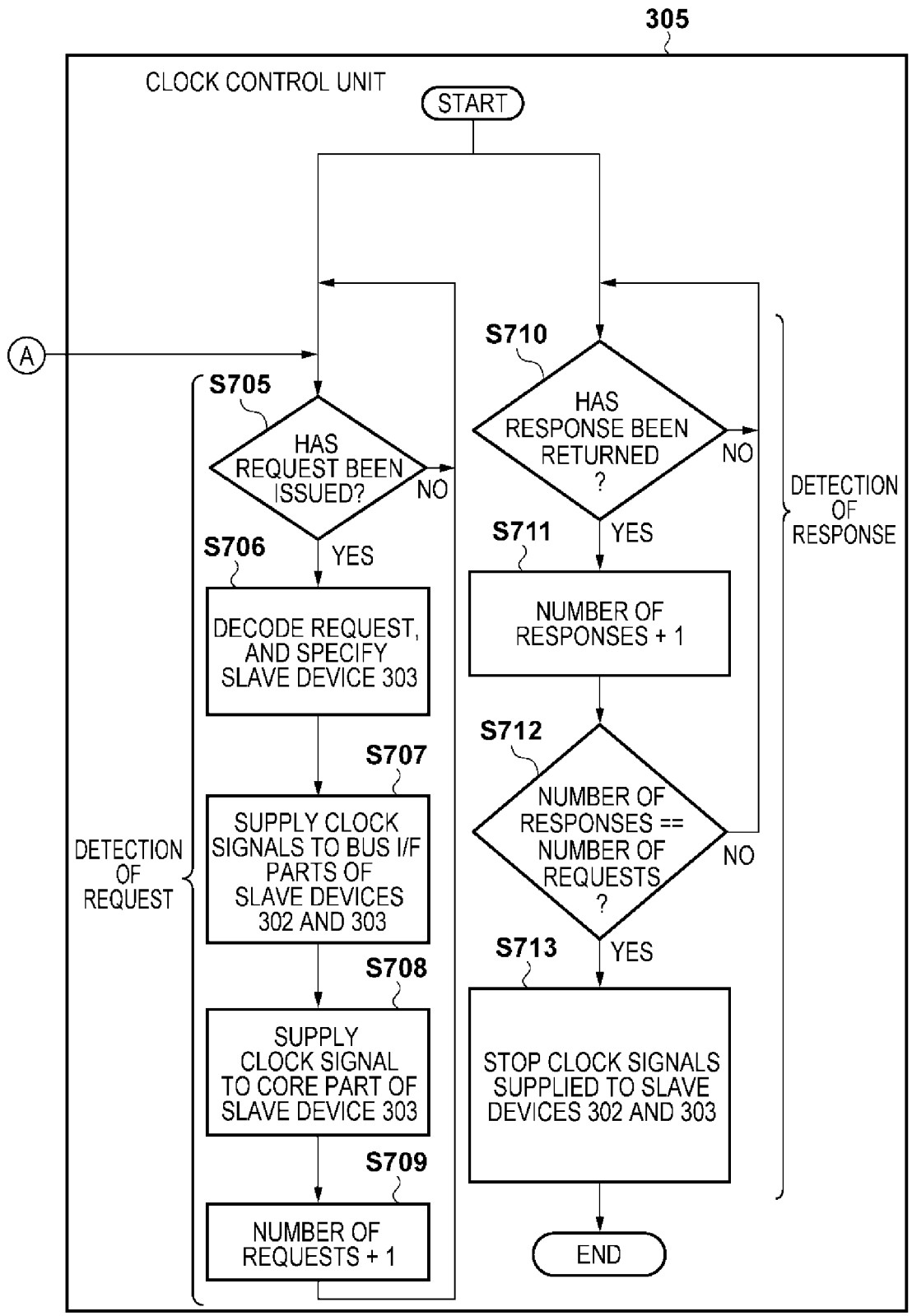

[Fig. 9A]
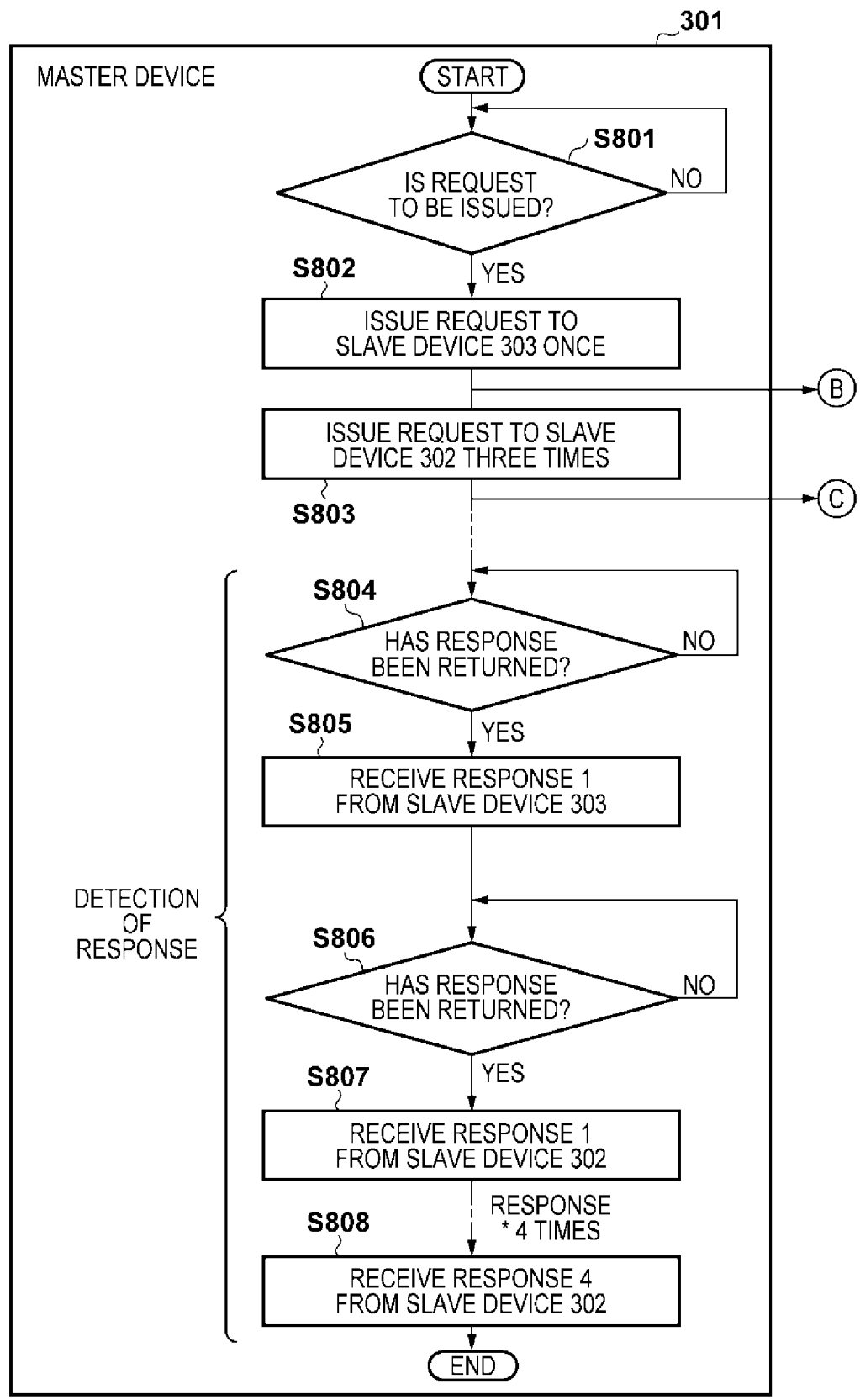

[Fig. 9B]
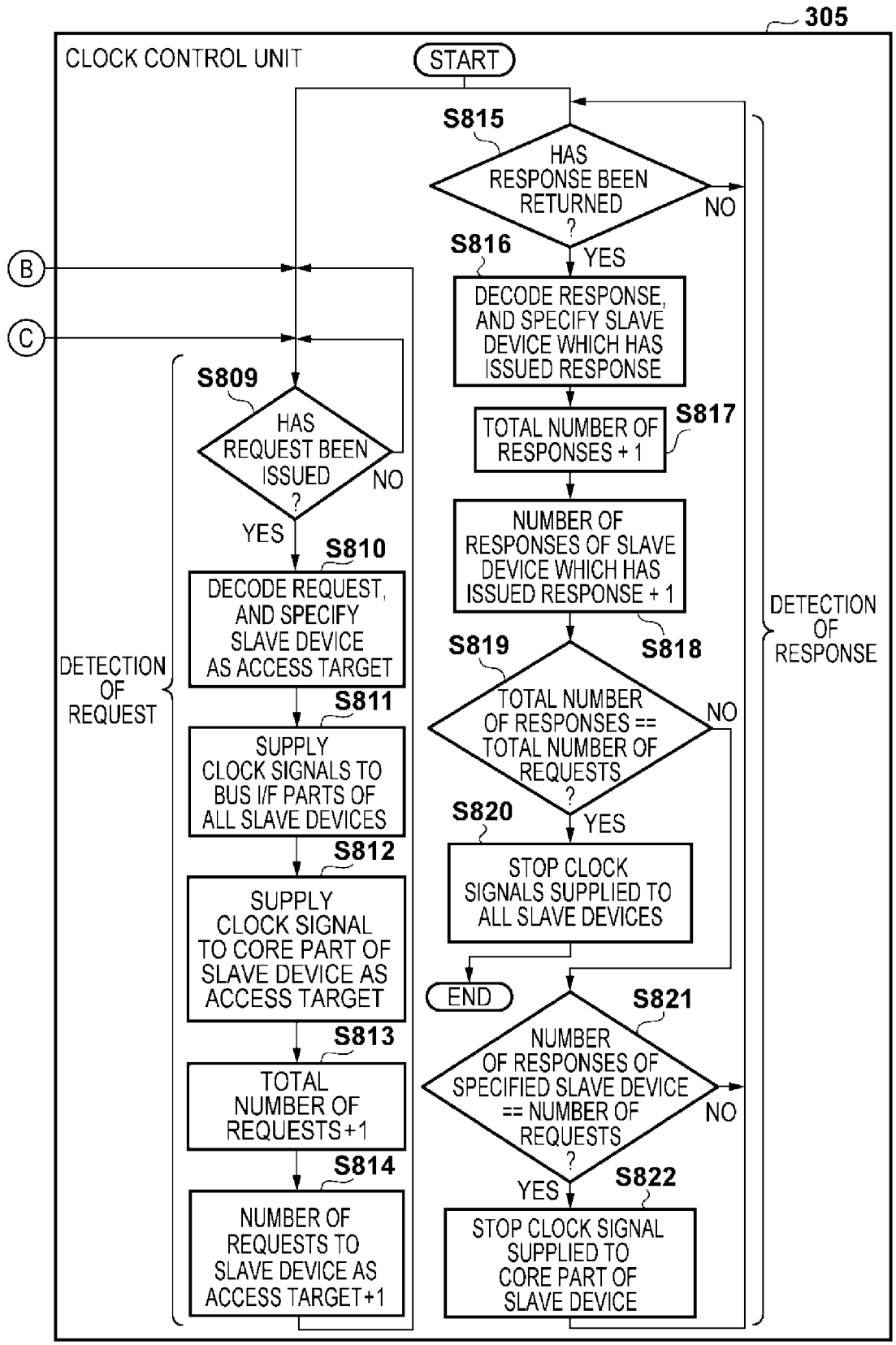

INFORMATION PROCESSING APPARATUS

TECHNICAL FIELD

The present invention relates to an information processing apparatus having a system formed by a ring bus.

BACKGROUND ART

In recent years, the circuit scale of a semiconductor integrated circuit apparatus has increased along with function expansion and improvement in performance, and a large number of peripheral circuits are used. On the other hand, to give consideration to the environment and satisfy various power saving regulations, an effective power consumption reduction method is increasingly attracting attention. For example, a method (clock gate) of reducing the total power consumption by stopping supply of clock signals to unnecessary peripheral circuits at the time of operation is used.

Japanese Patent Laid-Open No. 9-237131 describes an arrangement in which when one master device and a plurality of slave devices are connected, a clock signal is supplied to only a slave device that is an access target of the master device. An arrangement in which no clock signal is supplied the slave devices other than the access target is also described. Description is given of an arrangement in which, when a response signal issued by the slave device in response to one access demand (request) is detected, it is determined that access has ended, and supply of clock signals to all devices is stopped.

If, however, the clock gate method described in Japanese Patent Laid-Open No. 9-237131 is used for a system using a ring bus, a clock signal is supplied to only a slave device as an access destination, and slave devices other than the access target cannot operate. As a result, request data and response data cannot be circulated on the ring bus via the slave devices other than the access target on the ring bus. Thus, the arrangements described in Japanese Patent Laid-Open No. 9-237131 cannot be applied to a system that uses a ring bus.

SUMMARY OF INVENTION

An aspect of the present invention is to eliminate the above-mentioned problems with the conventional technology. The present invention provides a mechanism of appropriately controlling supply of clock signals to devices on a ring bus in a system that uses a ring bus.

The present invention in one aspect provides an information processing apparatus comprising: a master device; a plurality of slave devices communicably connected to the master device via a ring bus; and clock signal control means for controlling supply of clock signals to the slave devices, each of the plurality of slave devices including an interface part to the ring bus, and a core part configured to process data received by the interface part, and the clock signal control means including detection means for detecting a request issued by the master device to the slave device via the ring bus, first clock signal supply means for supplying a first clock signal to each of the interface parts of the slave devices in accordance with the detection of the request by the detection means, specifying means for specifying the slave device as a target of the request detected by the detection means, and second clock signal supply means for supplying a second clock signal to the core part of the slave device specified by the specifying means.

According to the present invention, in a system using a ring bus, it is possible to appropriately control supply of clock signals to devices on the ring bus.

Further features of the present invention will become apparent from the following description of exemplary embodiments with reference to the attached drawings.

BRIEF DESCRIPTION OF DRAWINGS

FIG. 1 is a block diagram showing the arrangement of a printing apparatus.

FIG. 2 is a timing chart according to a ring bus protocol.

FIG. 3 is a block diagram showing a semiconductor integrated circuit apparatus using a ring bus.

FIG. 4 is a block diagram showing the arrangement of a master device.

FIG. 5 is a block diagram showing the arrangement of a slave device.

FIG. 6 is a block diagram showing the arrangement of a clock control unit.

FIG. 7 is a block diagram showing the arrangement of a clock control unit.

FIG. 8A is a flowchart illustrating processing of controlling supply of clock signals.

FIG. 8B is a flowchart illustrating processing of controlling supply of clock signals.

FIG. 9A is a flowchart illustrating processing of controlling supply of clock signals.

FIG. 9B is a flowchart illustrating processing of controlling supply of clock signals.

DESCRIPTION OF EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

First Embodiment

FIG. 1 is a block diagram showing the arrangement of a printing apparatus using a ring bus. A printing apparatus 100 is formed by including a CPU (Central Processing Unit) 101 for comprehensively controlling the printing apparatus 100, a print device 102, a scan device 103, an image processing device 104, a storage device 105, and a clock generation device 106. The printing apparatus 100 may include other components. Although not shown, the printing apparatus 100 includes general-purpose ROM and RAM. An operation according to this embodiment is implemented when, for example, the CPU 101 reads out a program stored in the storage device 105, the ROM, or the like, and executes it.

The image processing device 104 is formed by, for example, a semiconductor integrated circuit in which a ring bus is formed. One master device 301 and a plurality of slave devices 302 and 303 are interconnected in a ring shape (annular shape), and a request 110 issued from the master device 301 is circulated on a ring-shaped bus (to be referred to as a ring bus hereinafter). The request 110 sequentially reaches the slave devices 302 and 303, and finally returns to the master device 301. The slave devices 302 and 303 will be collectively referred to as slave devices hereinafter.

Upon receiving the request 110, the slave device immediately transmits the request to the next slave device or the master device 301. At the same time, the slave device decodes the request, and determines whether the slave itself which has decoded the request is the access target of the request. If it is determined that the slave itself is the access target, the slave device which has performed this determination processing executes a data read/write operation in accordance with the request, and issues a response signal 111; otherwise, the slave device which has performed this determination processing neglects the contents of the request. In this case, the slave device directly transfers the received request to the next device on the ring bus.

The ring bus according to this embodiment has, as its features, the following two points. One feature is that if the device connected to the ring bus has no function of circulating a request and a response on the ring bus or the function is disabled, the device cannot perform data communication on the ring bus. The other feature is that the plurality of slave devices are connected to the ring bus, and thus the master device can successively issue requests to the respective slave devices. Each slave device decodes the received request, and determines whether the self device should process the request. If it is determined that the self device should process the request, the slave device executes processing in accordance with the request.

FIG. 2 is a timing chart showing a data write operation in accordance with a data communication protocol on the ring bus. A timing chart 200 showing an example of the ring bus protocol shows the timing chart of a clock signal 201, a read/write selection signal 202, and a request signal 203. Furthermore, the timing chart 200 shows the timing chart of request data 204, a response signal 205, and response data 206.

A clock signal 201 is a clock signal necessary to secure the operation of the ring bus. The read/write selection signal 202 is a signal indicating the type of request issued by the master device 301. For example, a level of 1_read_0_write=1 is set for a read request, and a level of 1_read_0_write=0 is set for a write request. FIG. 2 shows the case of a write request.

The request signal 203 is a signal asserted (validated) when the master device 301 attempts to issue a request or the slave device attempts to transmit the request to the next device. The request data 204 includes write data 208 and an address 207 as information for specifying a slave device as a request target. The request data 204 is issued from the master device 301, and circulates on the ring bus.

The response signal 205 is a signal asserted when the slave device notifies the master device 301 that execution of processing has ended (that is, a write operation has succeeded). The response data 206 includes an address 209 as information for specifying the slave device as a request target. After the execution of the processing by the slave device, the response data 206 is issued and returned to the master device 301. The address 209 of the response data 206 matches the address 207 of the request data 204.

The above-described signals and data 201 to 206 used for the ring bus indicate merely an example of the ring bus protocol, and the ring bus may be implemented by other signals and data systems.

FIG. 3 is a block diagram showing the arrangement of the image processing device 104 using the ring bus. The image processing device 104 is formed by including the master device 301, the slave devices 302 and 303, and a clock control unit 305.

The master device 301 and the slave devices 302 and 303 are connected to a ring bus 304. Clock signals 307, 308, and 309 necessary for the operations of the slave devices 302 and 303 are supplied from the clock control unit 305 to the slave devices 302 and 303. The clock control unit 305 generates the clock signals 307 to 309 from clock signals 306 supplied from the clock generation device 106.

The clock control unit 305 monitors a request issued by the master device 301 on the ring bus 304 and a response returned from each slave device, and then determines whether to supply the clock signals to the slave devices 302 and 303.

FIG. 4 is a block diagram showing the arrangement of the master device 301. The master device 301 is formed by including a control unit 401, a storage unit 402, a ring bus transmission unit 403, and a ring bus reception unit 404.

The control unit 401 includes a CPU (Central Processing Unit), a RAM (Random Access Memory), or a dedicated circuit device, and controls the operation of the master device 301. The storage unit 402 includes a mass storage device such as an HDD (Hard Disk Drive). The storage unit 402 stores a program for operating the master device 301, writing data in the slave devices 302 and 303, reading data from the slave devices 302 and 303, and the like.

The ring bus transmission unit 403 is a circuit device which is controlled by the control unit 401, and issues a request to the slave device 302 or 303 in accordance with the protocol of the ring bus 304. The ring bus reception unit 404 is a circuit device which receives a response from the slave device 302 or 303 in accordance with the protocol on the ring bus 304.

A clock signal 405 is supplied to the control unit 401 and the storage unit 402, and a clock signal 406 is supplied to the ring bus transmission unit 403 and the ring bus reception unit 404. The clock signal 405 is a clock signal which is supplied from the clock generation device 106 and used to operate the core part of the master device 301. The clock signal 406 is a clock signal which is supplied from the clock generation device 106 and used to operate the bus interface part (I/F) of the master device 301. The clock signals 405 and 406 may be identical.

FIG. 5 is a block diagram showing the arrangement of each of the slave devices 302 and 303. The slave devices 302 and 303 have the same arrangement, and the slave device 302 will be described below as a representative example of the slave device. The slave device 302 includes a ring bus reception unit 501, a ring bus transmission unit 502, a decoder unit 503, a read/write unit 504, a response generation unit 505, and a storage unit 506.

The ring bus reception unit 501 receives data (request data 204/response data 206) from the master device 301 or the slave device in accordance with the protocol of the ring bus 304. The ring bus reception unit 501 transfers the received data to the ring bus transmission unit 502 and the decoder unit 503.

The ring bus transmission unit 502 transmits data (request data 204/response data 206) to the master device 301 or the slave device in accordance with the protocol on the ring bus 304. The transmitted data is the data (request data 204/response data 206) transferred from the ring bus reception unit 501 or data transferred from the read/write unit 504 and the response generation unit 505.

The decoder unit 503 decodes the data transferred from the ring bus reception unit 501, and determines whether the data is a request or response. If it is determined that the data is a request, the decoder unit 503 further determines whether the request is a request to the self slave device. The decoder unit 503 determines whether the request is a read request or write request to the self slave device. If it is determined that the request is a read request, the decoder unit 503 outputs a read command to the read/write unit 504. Alternatively, if it is determined that the request is a write request, the decoder unit 503 outputs a write command and write data to the read/write unit 504.

The read/write unit 504 performs a read/write operation for the storage unit 506 in accordance with the command from the decoder unit 503. The read/write unit 504 notifies the response generation unit 505 of completion of the read/write operation. Upon receiving the notification from the read/write unit 504, the response generation unit 505 generates the response signal 205 and outputs it to the ring bus transmission unit 502 in accordance with the protocol on the ring bus 304.

The storage unit 506 includes a storage device such as a RAM or register, and reads out, in accordance with the read command from the read/write unit 504, data stored at a predetermined address in the storage device. Furthermore, the storage unit 506 stores the write data at a predetermined address in the storage device in accordance with the write command from the read/write unit 504.

A clock signal 507 is supplied to the ring bus reception unit 501 and the ring bus transmission unit 502, and a clock signal 508 is supplied to the decoder unit 503, the read/write unit 504, the response generation unit 505, and the storage unit 506. The clock signal 507 is a clock signal for operating the bus I/F part of the slave device 302, and corresponds to the clock signal 307 shown in FIG. 3. The clock signal 508 is a clock signal for operating the core part of the slave device 302, and corresponds to the clock signal 308 or 309 shown in FIG. 3.

In this embodiment, different reference numerals are used as follows for descriptive convenience. That is, the slave device 302 is formed by a bus I/F part including the ring bus reception unit 501 and the ring bus transmission unit 502, and a core part including the decoder unit 503, the read/write unit 504, the response generation unit 505, and the storage unit 506. The clock signal 507 is supplied to the bus I/F part and the clock signal 508 is supplied to the core part. The slave device 303 is formed by a bus I/F part including a ring bus reception unit 509 and a ring bus transmission unit 510, and a core part including a decoder unit 511, a read/write unit 512, a response generation unit 513, and a storage unit 514. A clock signal 515 is supplied to a bus I/F part and a clock signal 516 is supplied to a core part.

FIG. 6 is a block diagram showing the arrangement of the clock control unit 305. The clock control unit 305 is formed by including a request reception unit 601, a decoder unit 602, a response reception unit 603, a counter unit 604, a comparison unit 605, and a clock signal control unit 606.

The request reception unit 601 detects a request signal 607 issued by the master device 301, and outputs it to the decoder unit 602. The request reception unit 601 also outputs the request signal 607 to the counter unit 604 to count the number of request signals. The decoder unit 602 decodes the request received from the request reception unit 601, specifies a slave device as an access target, and transmits a command to the clock signal control unit 606. The clock signal control unit 606 generates appropriate clock signals, and supplies them to the slave devices 302 and 303.

The response reception unit 603 detects a response signal 608 issued by the slave device 302 or 303, and outputs it to the counter unit 604 to count the number of response signals. Upon receiving commands from the request reception unit 601 and the response reception unit 603, the counter unit 604 counts the number of issued request signals or the number of returned response signals. The counter unit 604 outputs the count result to the comparison unit 605.

Upon receiving the count result from the counter unit 604, the comparison unit 605 compares the number of requests with the number of responses, and determines whether the numbers are equal to each other. If it is determined that the numbers are equal to each other, the comparison unit 605 outputs a command to the clock signal control unit 606. The clock signal control unit 606 appropriately stops supply of the clock signals. On the other hand, if it is determined that the numbers are not equal to each other, the comparison unit 605 outputs no command to the clock signal control unit 606.

Upon receiving the commands from the decoder unit 602 and the comparison unit 605, the clock signal control unit 606 specifies, among input clock signals 609, clock signals 610 to be supplied, and supplies the specified clock signals 610 to the slave devices 302 and 303. The clock signals 609 in FIG. 6 correspond to the clock signals 306 in FIG. 3. The clock signals 610 in FIG. 6 correspond to the clock signals 307, 308, and 309 in FIG. 3.

FIGS. 8A and 8B are flowcharts illustrating processing of controlling supply of the clock signals according to this embodiment. This embodiment will describe, as an example, an operation in which the master device 301 issues a request signal to the slave device 303 once, and the slave device 303 receives the request signal and returns a response signal after the end of a write operation. FIGS. 8A and 8B are flowcharts illustrating processing in which the clock control unit 305 detects the request signal and response signal, and controls supply of the clock signals. Respective processes in FIGS. 8A and 8B are implemented when, for example, the CPU 101 reads out, into the RAM, the program of controlling the image processing device 104 stored in the ROM, and executes it.

In steps S701 to S704, an operation in which the master device 301 issues a write command to the slave device 303 once, and detects a response signal is performed. The control unit 401 of the master device 301 executes the program stored in the storage unit 402, and determines whether to issue a request signal (step S701). If it is determined to issue a request signal, the process advances to step S702; otherwise, the processing in step S701 is repeated.

The control unit 401 of the master device 301 issues a write request signal to the slave device as an access target via the ring bus transmission unit 403 (step S702). The control unit 401 of the master device 301 determines whether the slave device 303 has returned a response signal via the ring bus reception unit 404 (step S703). If it is determined that the response signal has been returned, the process advances to step S704; otherwise, the processing in step S703 is repeated. The control unit 401 of the master device 301 receives the response signal from the slave device 303 via the ring bus reception unit 404 (step S704).

In steps S705 to S709, an operation in which the clock control unit 305 detects the request signal issued by the master device 301, and supplies, to the slave devices 302 and 303, the clock signals to be supplied to the slave devices 302 and 303.

The request reception unit 601 of the clock control unit 305 determines whether the request signal from the master device 301 has been detected (step S705). If it is determined that the request signal has been detected, the process advances to step S706; otherwise, the processing in step S705 is repeated.

The decoder unit 602 of the clock control unit 305 decodes the request signal, specifies the address of the slave device 303 as the access target of the master device 301, and outputs a control signal to the clock signal control unit 606 (step S706). The clock signal control unit 606 of the clock control unit 305 enables (validates), among the input clock signals 609, the clock signals of the bus I/F parts of the slave devices 302 and 303 (that is, all the slave devices). Then, the clock signal control unit 606 supplies the enabled clock signals to the slave devices 302 and 303 (step S707).

The clock signal control unit 606 of the clock control unit 305 enables, among the input clock signals 609, the clock signal of the core part of the slave device 303 as the access target, and supplies it to the slave device 303 (step S708). That is, no clock signal is supplied to the core part of the slave device 302. The counter unit 604 of the clock control unit 305 increments, by +1, the number of requests allocated as a variable area in the RAM or the like (step S709). After step S709, the processes are repeated from step S705.

In steps S710 to S713, the clock control unit 305 detects a response signal issued by the slave device. The clock control unit 305 counts the number of detected response signals. If it is determined that access by all the request signals has ended, supply of the clock signals to the slave devices is stopped.

The response reception unit 603 of the clock control unit 305 determines whether a response signal from the slave device 303 has been detected (step S710). If it is determined that the response signal has been detected, the process advances to step S711; otherwise, the processing in step S710 is repeated. The counter unit 604 of the clock control unit 305 increments, by +1, the number of responses allocated as a variable area in the RAM or the like (step S711).

The comparison unit 605 of the clock control unit 305 compares the number of requests with the number of responses at this time, and determines whether the number of requests and the number of responses are equal to each other (step S712). The comparison unit 605 outputs the comparison result to the clock signal control unit 606.

The clock signal control unit 606 of the clock control unit 305 receives the comparison result. If the number of requests and the number of responses are equal to each other, it is determined that access by all the request signals has ended. The clock signal control unit 606 stops supply of the clock signals to both the bus I/F part and the core part of each of the slave devices 302 and 303 (step S713). On the other hand, if the number of requests and the number of responses are not equal to each other, the process returns to step S710 to transit to the state in which detection of a response signal is determined.

As described above, if access by the request signal from the master device 301 occurs, the clock signals are supplied to the bus I/F parts of all the slave devices and the operation of the bus is secured under the control of the clock control unit 305. With respect to the slave device (for example, the slave device 303) as the access target, the clock signal is supplied to the core part of the slave device, and thus the normal operation of the slave device is also secured. With respect to the slave device other than that as the access target, no clock signal is supplied to the core part of the slave device, and thus the power consumption is reduced. If the clock control unit 305 detects all the response signals from the slave device (for example, the slave device 303) as the access target, it determines that all access has successfully ended, and stops supply of all the clock signals to the slave devices. As a result, the power consumption can be reduced more.

Furthermore, this embodiment has explained the system operation when the master device 301 issues a request signal once. However, even if the master device 301 issues a request signal a plurality of times, it is possible to implement the same operation using the count operation of the counter unit 604 of the clock control unit 305.

Second Embodiment

The second embodiment will be described by focusing attention on the difference from the first embodiment.

FIG. 7 is a block diagram showing the arrangement of a clock control unit 305 according to this embodiment. The clock control unit 305 is formed by including a request reception unit 601, a decoder unit 602, a response reception unit 603, a counter unit 604, a comparison unit 605, and a clock signal control unit 606.

The request reception unit 601 detects a request signal 607 issued by a master device 301, and outputs it to the decoder unit 602. The response reception unit 603 detects a response signal 608 issued by a slave device 302 or 303, and outputs it to the decoder unit 602. The decoder unit 602 decodes the request signal or the response signal, specifies the slave device as an access target, and outputs a command to the clock signal control unit 606. Upon receiving the command from the decoder unit 602, the clock signal control unit 606 generates appropriate clock signals, and supplies the generated clock signals to the slave devices 302 and 303. The decoder unit 602 notifies the counter unit 604 that the request signal or response signal associated with the specified slave device as the access target has been detected.

The counter unit 604 counts the total number of requests to all the slave devices and the total number of responses from all the slave devices. The counter unit 604 also counts the number of requests and the number of responses for each slave device. The counter unit 604 outputs a count result to the comparison unit 605. The comparison unit 605 receives the count result from the counter unit 604, compares the total number of requests with the total number of responses, and determines whether the numbers are equal to each other. If it is determined that the numbers are equal to each other, the comparison unit 605 outputs a command to the clock signal control unit 606, and the clock signal control unit 606 stops supply of all the clock signals to the slave devices. On the other hand, if it is determined that the number are not equal to each other, the comparison unit 605 determines whether the number of requests and the number of responses for each slave device are equal to each other. If it is determined that the numbers are equal to each other, the comparison unit 605 outputs, to the clock signal control unit 606, a command to stop the clock signal to the core part of the slave device corresponding to this determination processing.

The clock signal control unit 606 receives the commands from the decoder unit 602 and the comparison unit 605, specifies, among input clock signals 609, clock signals 610 to be supplied, and supplies the specified clock signals 610 to the slave devices 302 and 303. The clock signals 609 in FIG. 7 correspond to the clock signals 306 in FIG. 3. The clock signals 610 in FIG. 7 correspond to the clock signals 307, 308, and 309 in FIG. 3.

FIGS. 9A and 9B are flowcharts illustrating processing of controlling supply of the clock signals according to this embodiment. This embodiment will describe, as an example, a case in which the master device 301 issues a request signal to the slave device 303 once, and then issues a request signal to the slave device 302 three times. Differences from the first embodiment will be described below.

In steps S801 to S808, an operation in which the master device 301 issues request signals to the slave devices 302 and 303 a plurality of times, and receives response signals returned from the slave devices is performed. The operation is the same as in the first embodiment except for the number of request signals and the number of response signals and a description thereof will be omitted.

In steps S809 to S814, an operation in which the clock control unit 305 detects the request signal from the master device 301, and supplies, to the slave devices 302 and 303, the clock signals to be supplied to the slave devices 302 and 303.

The request reception unit 601 of the clock control unit 305 determines whether the request signal from the master device 301 has been detected (step S809). If it is determined that the request signal from the master device 301 has been detected, the process advances to step S810; otherwise, the processing in step S809 is repeated.

The decoder unit 602 of the clock control unit 305 decodes the request signal, specifies the address of the slave device as the access target of the master device 301, and outputs a control signal to the clock signal control unit 606 (step S810).

The clock signal control unit 606 of the clock control unit 305 enables the clock signals of the bus I/F parts of the slave devices 302 and 303 among the input clock signals 609, and supplies them to the slave devices 302 and 303 (step S811). The clock signal control unit 606 of the clock control unit 305 enables the clock signal of the core part of the slave device specified in step S810 among the input clock signal 609, and supplies it to the specified slave device (step S812).

The counter unit 604 of the clock control unit 305 increments, by +1, the total number of requests allocated as a variable area in a RAM or the like (step S813). The counter unit 604 of the clock control unit 305 increments, by +1, the number of requests to the slave device specified in step S810, which is allocated as a variable area in the RAM or the like (step S814).

If the master device 301 issues a request signal to the slave device 303 once, the clock control unit 305 supplies the clock signals to the bus I/F parts of the slave devices 302 and 303 and the core part of the slave device 303 in accordance with the above-described procedure. After that, if the master device 301 issues a request signal to the slave device 302 once, the clock control unit 305 starts to supply the clock signal to the core part of the slave device 302. That is, when the master device 301 performs the remaining three request issuance operations to the slave device 302, the clock signal has already been supplied to the core part of the slave device 302.

In steps S815 to S822, an operation in which the clock control unit 305 detects response signals from the slave devices, counts the number of responses, and stops supply of the clock signals at an appropriate timing is performed.

The response reception unit 603 of the clock control unit 305 determines whether a response signal from the slave device has been detected (step S815). If it is determined that a response signal from the slave device has been detected, the process advances to step S816; otherwise, the processing in step S815 is repeated.

The decoder unit 602 of the clock control unit 305 decodes the received response data, and specifies the slave device which has issued the response signal (step S816). The counter unit 604 of the clock control unit 305 increments, by +1, the total number of responses allocated as a variable area in the RAM or the like (step S817). The counter unit 604 of the clock control unit 305 increments, by +1, the number of responses from the slave device specified in step S816, which is allocated as a variable area in the RAM or the like (step S818).

The comparison unit 605 of the clock control unit 305 compares the total number of requests with the total number of responses at this time (step S819). If the total number of requests and the total number of responses are equal to each other, the comparison unit 605 transmits, to the clock signal control unit 606, a command to stop supply of all the clock signals to the slave devices, and the process advances to step S820; otherwise, the process advances to step S821.

In step S820, upon receiving the stop command from the comparison unit 605, the clock signal control unit 606 of the clock control unit 305 stops supply of all the clock signals to the slave devices. After that, the processing of FIGS. 9A and 9B ends.

In step S821, the comparison unit 605 of the clock control unit 305 compares the number of requests issued to the slave device specified in step S816 with the number of responses. If the number of requests and the number of responses are equal to each other, the comparison unit 605 transmits, to the clock signal control unit 606, a command to stop supply of the clock signal to the core part of the corresponding slave device, and the process advances to step S822; otherwise, the processes are repeated from step S815.

In step S822, upon receiving the stop command from the comparison unit 605, the clock signal control unit 606 of the clock control unit 305 stops supply of the clock signal to the core part of the slave device specified in step S816.

As described above, the slave device 303 receives a request from the master device 301, and returns a response signal after the end of execution of corresponding processing. If, for example, the total number of requests is 5 and the total number of responses is 1 when the response signal is detected, the clock control unit 305 does not stop supply of the clock signals to the bus I/F parts of the slave devices 302 and 303. If the number of requests to the slave device 303 is 1 and the number of responses from the slave device 303 is 1, the clock control unit 305 determines that all access to the slave device 303 has ended. The clock control unit 305 preferentially stops supply of the clock signal (that is, some of all the supplied clock signals) to the core part of the slave device 303 over the other slave device.

After that, if the slave device 302 returns a response signal four times, the total number of requests and the total number of responses are both 5. At this time, the clock control unit 305 determines that all access to the slave devices has ended, and stops supply of all the clock signals to the slave devices. Therefore, even if access to a specific slave device often occurs, an unnecessary clock operation can be preferentially stopped, and the power consumption can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166184, filed Aug. 25, 2015, which is hereby incorporated by reference herein in its entirety.

The invention claimed is:

1. An information processing apparatus comprising:
a master device;
a first slave device;
a second slave device,
   wherein first data is sent to a core part of the first slave device via an interface of the first slave device from the master device and processed by the core part of the first slave device, and the processed first data is sent to the master device via an interface of the second slave device, and
   wherein second data is sent to a core part of the second slave device via the interface of the first slave device from the master device and processed by the core part of the second slave device, and the processed second data is sent to the master device via the interface of the second slave device; and
a clock signal control unit configured to control supply of clock signals to the first slave device and the second slave device,
wherein the clock signal control unit includes
a determination unit configured to determine a slave device that processes data sent from the master device;
a clock supplying unit configured to supply clock signals to the interface of the first slave device, the interface of the second slave device, and the core part of the second slave device, and not to supply a clock signal to the core part of the first slave device, in order to process the data if the slave device determined by the determination unit is the second device.

2. The apparatus according to claim 1, further comprising:
a comparison unit configured to compare the number of the first data sent from the master device with the number of the first data having been processed by the core part of the first slave device and compare the number of the second data sent from the master device with the number of the second data having been processed by the core part of the second slave device, and
the clock signal control unit controls supply of clock signals to the first slave device and the second slave device based on a result of the comparison by the comparison unit.

3. The apparatus according to claim 2, further comprising:
a count unit configured to count the number of the second data sent from the master device and the number of the second data having been processed by the core part of the second slave device,
wherein the comparison unit compares the number of the second data sent from the master device counted by the count unit with the number of the second data having been processed by the core part of the second slave device.

4. The apparatus according to claim 2, wherein the clock signal control unit controls the clock supplying unit to stop supply of the clock signals to the first slave device and the second slave device based on the result of the comparison by the comparison unit.

5. The apparatus according to claim 4, wherein in a case where the master device sends a plurality of the first data and a plurality of the second data, the clock supplying unit stops supplying a clock signal to the core part of the first slave device based on that the number of the first data sent from the master device and the number of the first data having been processed by the core part of the first slave device correspond to each other, and stops supplying a clock signal to the core part of the second slave device based on that the number of the second data sent from the master device and the number of the second data having been processed by the core part of the second slave device correspond to each other.

6. The apparatus according to claim 2, wherein the clock control unit further determines whether data sent to the master device is data having been processed by the core part of the first slave device or data having been processed by the core part of the second slave device.

7. The apparatus according to claim 1, wherein the master device sends the first data and the second data complying with a protocol on a ring bus, and receives the first data having been processed by the core part of the first slave device and the second data having been processed by the core part of the second slave device complying with the protocol on the ring bus from each of the plurality of slave devices.

8. The apparatus according to claim 1, wherein the first slave device receives the first data complying with a protocol on a ring bus, and sends the first data having been processed by the core part of the first slave device.

9. The apparatus according to claim 1, wherein the interface of the first slave device is a circuit having a function of receiving the first data sent from the master device and sending the first data having been processed by the core part of the first slave device to the interface of the second slave device.

10. The apparatus according to claim 1, wherein the core part of the first slave device is a circuit having a function of decoding the first data and the second data sent from the master device, determining whether data sent from the master device is the first data or not, and executing, in a case where it is determined that the data sent from the master device is the first data, processing of the first data.

* * * * *